United States Patent
Schuyler (10) Patent No.: US 6,195,949 B1
(45) Date of Patent: Mar. 6, 2001

(54) HOLD DOWN DEVICE AND METHOD

(76) Inventor: Peter William Schuyler, P.O. Box 567, Glenellen, CA (US) 95442

( * ) Notice: Subject to any disclaimer, the term of this patent is extended or adjusted under 35 U.S.C. 154(b) by 0 days.

(21) Appl. No.: 09/460,276

(22) Filed: Dec. 13, 1999

Related U.S. Application Data (62) Division of application No. 08/936,277, filed on Sep. 24, 1997, now abandoned.

(51) Int. Cl.$^7$ ...................................................... E04L 5/08
(52) U.S. Cl. ...................... 52/223.13; 52/92.2; 52/223.6; 52/223.14; 411/392; 411/544; 411/916
(58) Field of Search .......................... 52/223.13, 223.14, 52/223.6, 92.2, 23, 293.3, 295, DIG. 11; 411/392, 544, 916, 14, 908, 411; 24/122.6, 461, 486, 488

(56) References Cited

U.S. PATENT DOCUMENTS

| | | | |
|---|---|---|---|
| 3,921,257 | * | 11/1975 | Appleby et al. ................... 24/122.6 |
| 3,937,607 | * | 2/1976 | Rodomer ............................. 425/111 |
| 4,124,321 | * | 11/1978 | Hutchins ............................. 403/167 |
| 4,160,615 | * | 7/1979 | Baldwin ............................. 405/259 |
| 4,718,209 | * | 1/1988 | Hansen et al. ..................... 52/223.1 |
| 4,812,096 | * | 3/1989 | Peterson ............................. 411/231 |
| 5,168,681 | * | 12/1992 | Ayrapetyan ........................ 52/223.1 |
| 5,384,993 | * | 1/1995 | Phillips .............................. 52/92.2 |
| 5,535,561 | * | 7/1996 | Schuyler ........................... 52/223.13 |

* cited by examiner

*Primary Examiner*—Carl D. Friedman
*Assistant Examiner*—Yvonne M. Horton (57) ABSTRACT

A hold down device and method for connecting two building elements of a building comprises an elongate member, typically in the form of a rod or a cable, that is connected between the two building structures. A tension compensator, which includes a housing, is mounted to the elongate member to compensate for wood shrinkage of the building. One end of the elongate member penetrates the housing and is releasably connected to the housing by means of a gripping assembly which permits only one way movement of the elongate member into but not out of the housing to resist tensile forces between the two points of the building but allow the elongate member length to be adjusted as the distance between the two points decreases due to wood shrinkage. An urging mechanism urges the end of the elongate member further into the housing if the tension on the elongate member falls below a predetermined level. The urging mechanism, in some embodiments, has to be put under compression. One method involves the use of a hydraulic ram to achieve this.

2 Claims, 12 Drawing Sheets

HOLD DOWN DEVICE AND METHOD

This is a divisional application of U.S. patent application Ser. No. 08/936,277, entitled HOLD DOWN DEVICE AND METHOD, filed Sep. 24, 1997, by Peter William Schuyler, now abandoned.

BACKGROUND AND SUMMARY OF THE INVENTION

1. Field of the Invention

This invention relates to building construction apparatus and methods. In particular, this invention relates to apparatus for securing parts of a building to one another or to the ground for providing stability to the building against environmental conditions such as earthquakes, hurricanes and other forces seeking to lift, separate, or topple the building.

2. Description of the Prior Art

Figure 1:
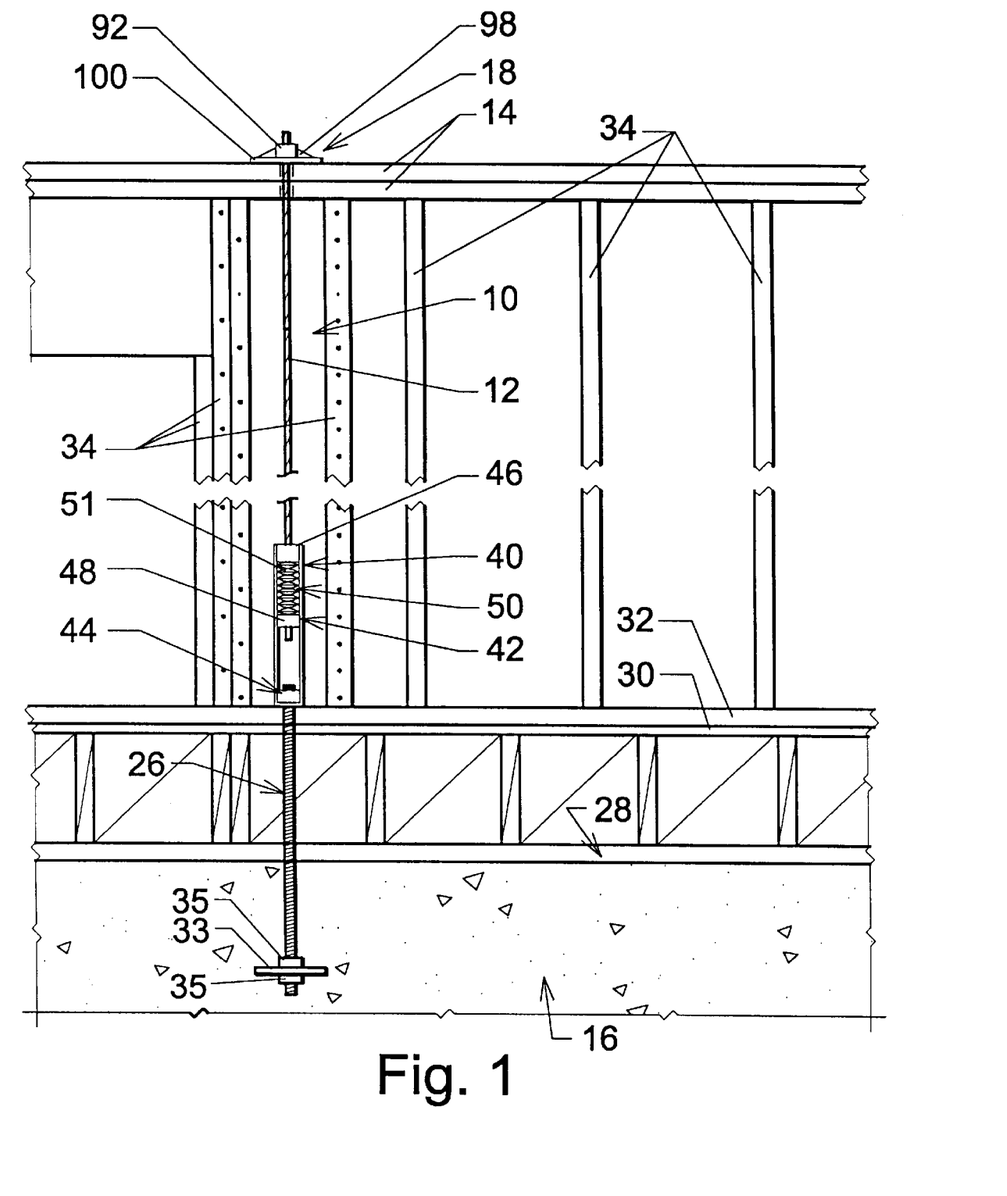
FIG. 1 is a partially sectioned side view of an embodiment of the hold down and bracing system of the invention.

A common type of building structure comprises structural framing members to which shear diaphragms such as plywood sheets are secured to provide the frame with shear stability. Typically the framing members include upper and a lower horizontally extending members, sometimes referred to as the top plate(s) and the sill plate, respectively. These are separated from each other by vertically extending ribs, also known as studs. The horizontal and vertical members are typically nailed or screwed together to define a wall, as illustrated in FIG. 1. Adjacent walls are usually connected to each other with the aid of a second upper member secured to the first upper member in a staggered relationship to overlap the first at the joinder of the walls. This is often replicated through the various floor levels to the roof. The lower members, on the other hand, are secured to the floor of the building structure. The roof joists are, in turn, nailed or screwed to the second upper member.

Ground movement or high winds exert forces on the building that tend to lift the upper horizontal members relative to the ground or cause the vertical and horizontal members to rotate relative to each other. To reduce the effects of earthquakes, ground movement, and high winds such as hurricanes, structural members have been developed to provide down force stabilization. Hold-down mechanisms are designed to resist separation forces and provide uplift stabilization.

As mentioned above, a common stabilization technique is the nailing of plywood sheets to the structural framing members. The sheets are connected to adjacent sheets and the foundation by means of the structural framing members to which they are nailed. They thus form a unified structure that resists uplift and overturning forces. In order to further enhance the structural integrity of the structure, the sheets are secured to each other and to the foundation by means of hold-downs. U.S. Pat. No. 4,655,672 describes hold-downs in the form of brackets that are secured to framing members using bolts. The brackets are attached to the vertical framing members by means of bolts extending horizontally or to horizontal framing members by means of vertically extending bolts. The brackets are, in turn, connected to each other or the foundation. For example, in the case of vertically extending members, the brackets comprise L-shaped brackets in which one leg of the bracket extends outwardly from the framing member. The outwardly extending legs of adjacent pairs of brackets are connected to each other by means of threaded rods thus interconnecting the floors of the building. In this manner the brackets are connected to each thereby, in turn, connecting the framing members. The brackets are also connected to the foundation by means of threaded rods embedded in the foundation. A disadvantage of the above approach is the failure to accommodate wood shrinkage which causes the tension in the threaded rods to be lost, permitting a certain amount of play and possibly resulting in impact loads and shear wall nail failures that increase the risk of failure. Furthermore, a connection is required wherever a cross members is encountered. Thus a large number of parts is required. Also, a large number of holes have to be drilled and the brackets carefully aligned resulting in a time consuming and costly procedure. Due to the shape of the brackets, eccentric forces are exerted on the brackets, which are exacerbated by the small contact area of the bolts resulting in large pressure on the connections.

Earthquakes also create moving point forces which are directed upward and sideways through the foundation to the framing members and cause the shear diaphragms to rotate and buckle. To reduce rotational and point loading the movement of the upper corners of the shear diaphragms relative to their foundation has to be contained. A number of devices have been developed to achieve this. One solution proposed is described in U.S. Pat. No. 4,875,314 to Boilen in which tie rods extend from the foundation up through the various levels of the building and is secured at each level to an anchor by means of a nut and spread plate. The use of a rod extending upward from the foundation allows uplift forces to be transmitted directly to the foundation. However this system has severe limitation in that it fails to take account of wood shrinkage. As framing members shrink the initial snug connection between the tie rods and the anchors is lost. The framing members are thus no longer snugly restrained and expose the system to impact forces. Nails holding the framing members together are thus more likely to be pulled out, thereby further comprising the structural integrity of the building.

This limitation was partially addressed in U.S. Pat. No. 2,011,312 to Engman in which a connecting device is described that includes springs for taking account of dimensional changes of the structural elements. This device is, however, limited in its ability to hold the structural elements together. Specifically, the strength of the system is limited by the compressive force of the springs.

The present applicant addressed this issue in this earlier patent application, U.S. Pat. No. 5,535,561, by developing a hold-down device comprising a cable that is anchored at one end and is releasably clamped at the other end. A spring acts on the cable to take account of shrinkage by automatically moving the cable relative to the releasable clamp as the structural members shrink. A drawback of the system described in U.S. Pat. No. 5,535,561, however, is the cost of providing appropriate springs having the desired length and compressive force characteristics. This requires a large number of different springs to be made to accommodate the various applications.

SUMMARY OF THE INVENTION

According to the invention there is provided a hold down device for connecting two building elements of a building structure to provide down force stabilization to the building. The device includes an elongate member, typically in the form of a rod or a cable, that is connected between the two building structures. A tension compensator is mounted at one end of the elongate member or between the ends of the elongate member to compensate for wood shrinkage of the building. The compensator is made up of a housing, e.g. in the form of a U-shaped bracket or a tube, and one of the elongate member penetrates the housing and is releasably connected to the housing by means of a gripping assembly which permits only one way movement of the elongate member into but not out of the housing. In this way the elongate member resists separation of the two points of the building but allows the elongate member length to be adjusted as the distance between the two points decreases due to wood shrinkage. The compensator, further, includes a spring mechanism for urging the end of the elongate member further into the housing if the tension on the elongate member falls below a predetermined level. The spring mechanism is made of one or more discrete resiliently flexible elements, the number of elements chosen depending on the amount of compensation that is required for the particular application. The elements comprise domed washers or resilient bushes, in use, housed in the housing in a compressed state.

In many vertical applications, the housing is connected to the foundation of the building by means of a nut received on an anchor bolt embedded in the foundation.

The hold down device may further include a second gripping assembly that is slidably received in the housing and serves to secure the end of the elongate member in the housing relative to the spring mechanism.

The gripping assemblies can take a variety of forms. One type comprises a cylinder having a central frusto-conical bore that slidably receives a plurality of wedges having outer surfaces complementarily engaging the walls that define the bore. The wedges have inwardly facing gripping surfaces, in practice, engaging the elongate member. Another embodiment of the gripping assembly comprises a pair of gripping wheels each rotatable in only one direction, in practice, engaging opposite sides of the elongate member, and rotatable in opposite directions. Yet another embodiment, comprises two or more pivotable arms pivotable about pins secured to the housing. The free ends of the arms are moveable towards each other and, in practice, engage opposite sides of the elongate member. The second gripping means may, instead, comprise a deformable sleeve crimped to the elongate member and secured to a slidable element that is slidably received in the housing.

Further, according to the invention there is provided a method of securing a building structure comprising the steps of choosing two spaced apart points on the building structure that are to be connected to each other to resist their separation when exposed to separating forces, drilling holes along a straight line extending between the spaced apart points through any intermediate building elements, feeding an elongate member having a first end and a second end between the two points, securing the first end of the elongate member to the building structure at one of the spaced apart points, securing the second end of the elongate member to a tension compensator, and connecting the tension compensator to the building structure at the second point, wherein the tension compensator includes a housing, at least one resiliently compressible washer or bush connected to the elongate member for exerting a force onto the elongate member to urge the elongate member into the housing when the washer(s) or bush(es) are in a compressed state, and a first gripping assembly for locking the elongate member relative to the housing to resist movement of the elongate member out of the housing while permitting movement of the elongate member into the housing. The method also includes the step of compressing the washers.

The step of compressing the washer or bush can be performed using a hydraulic ram or any other suitable device, or manually. A second gripping assembly is mounted on the elongate member inside the housing so that the washer or bush is located between the two gripping assemblies, the second gripping assembly being slidably received in the housing and being movable relative to the elongate member in a direction towards the first gripping assembly but locking relative to the elongate member when force is exerted on the second gripping assembly to move it away from the first gripping assembly. The second gripping assembly is forced towards the first gripping assembly, thereby compressing the washer or bush. A stop member is typically secured to the elongate member at a position to locate the second gripping assembly between the washer(s)/bush(es) and the stop member. Thereafter the second gripping assembly is forced away from the stop member.

According to another embodiment of the invention, there is provided a hold down device for connecting a first building element of a building structure to a second building element of the building structure, comprising a rod having a first end and a second end, and a gripping assembly for movably connecting the first end of the rod to the first building element, wherein the second end of the rod is connected to the second building element and the gripping assembly permits axial movement of the rod in only one direction to permit decreases in distance between the first and the second building elements, but resist separation of the first and second building elements.

According to yet another embodiment of the invention, there is provided a hold down device for connecting a first building element of a building structure to a second building element of the building structure, comprising a wire rope having a first end connected to the first building element, a weight connected to the second end of the rope and hanging downward to exert a tensile force on the rope due to gravitational pull on the weight, and a gripping assembly connecting the rope to the second building element in an adjustable manner for permitting movement of the rope through the gripping assembly in a direction to permit decreases in distance between the first and the second building elements while maintaining the tensile force on the rope due to the weight, but resisting separation of the first and second building elements.

DETAILED DESCRIPTION OF PREFERRED EMBODIMENTS

An embodiment of the cable hold down and bracing system of the present invention is illustrated in FIG. 1 and is depicted generally by reference number 10. The system 10 includes an elongate member which, in this embodiment, comprises a wire rope or threaded wire 12 made from any suitable material, including, for example, steel, kevlar, plastic, graphite, or synthetic carbon to mention but a few types. For convenience, the elongate member will hereafter, for this embodiment, be referred to generally as a cable. The cable 12 serves to connect one element of a building structure, in this case the top plates 14, to another element, in this case the foundation 16. By connecting the top plates 14 to the foundation 16 by means of the cable 12 and maintaining the cable under a predetermined tension, the structural integrity of the building is enhanced to withstand uplift and horizontal topling forces.

The cable 12 is connected to the top plates 14 by means of a conventional cable gripping device such as the cast metal gripping unit 18 illustrated in FIG. 1 and described in greater detail below. An example of the unit 18 is the "Surelock" device manufactured by Precision Screw Products Company Incorporated of 1718 W. Main Str, Grand Prairie, Tex. Instead of a gripping unit 18, a "dead-end" device, disclosed in the applicant's U.S. Pat. No. 5,535,561, can be used.

The lower end of the cable 12 is secured to the foundation 16 by means of an anchor bolt 26 embedded in the foundation 16. The anchor bolt 26 extends upwardly from the foundation 16 through the sill 28 and, in the case of a raised floor as illustrated in FIG. 1, through the sub floor 30 and sill plate 32. The anchor bolt 26 in this embodiment includes an enlarged portion thereby allowing the bolt 26 to be embedded more securely in the foundation 16. The enlarged portion takes the form of a spread plate 33 secured to the lower threaded end of the anchor bolt 26 by means of nuts 35. The spread plate 33 could, instead, be welded to the lower end of the anchor bolt. In yet another embodiment, the lower end of the anchor bolt is merely bent sideways to allow it to be embedded more securely in the foundation.

As mentioned above, the wooded elements of the building structure, for example the top plates 14 and studs 34 tend to shrink with time. In order to accommodate the change in dimension of the building and to ensure that the cable 12 remains under sufficient tension, the present invention provides for an automatic tension compensator 40 mounted between the anchor bolt 26 and the lower end of the cable 12. The cable 12 is thus connected to the foundation 16 by means of the compensator 40, which is, in turn, secured to the foundation by means of the anchor bolt 26. It will be appreciated that the compensator 40 need not necessarily be connected to the anchor bolt, but can equally well be positioned elsewhere along the cable 12, e.g. adjacent the gripping unit 18, or intermediate the gripping unit 18 and the anchor bolt 26 with sections of the cable 12 extending from opposite ends of the compensator 40. An advantage of placing the compensator 40 adjacent the anchor bolt, however, is that tensioning of the system can be performed in an easily accessible location, ie. on the ground floor. Furthermore, the weight of the cable 12 need not be compensated for by the compensator, as would be the case if the compensator were installed at the upper end of the cable 12.

Figure 2:
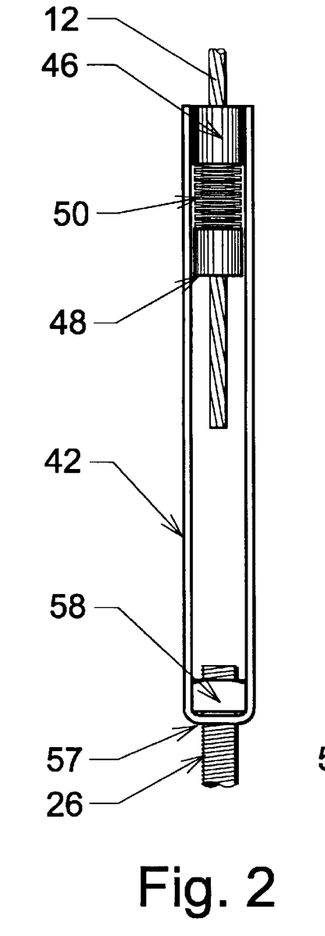
FIG. 2 is a side view of a compensator, cable and anchor bolt of one embodiment of the invention.
Figure 3:
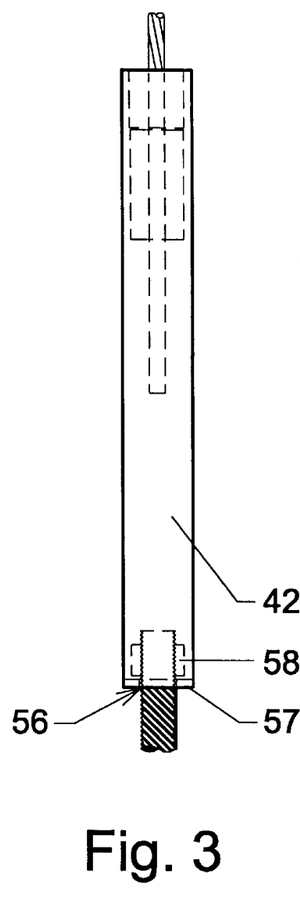
FIG. 3 is a sectional front view of the housing of the compensator of FIG. 2 and the anchor bolt secured to the housing.
Figure 4:
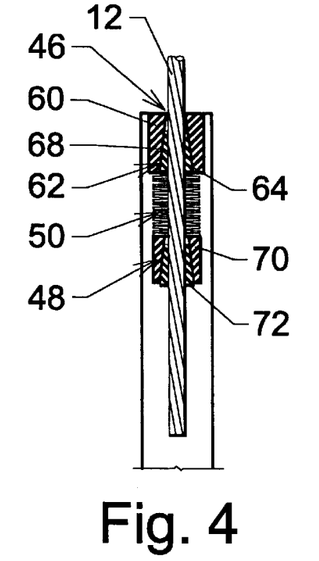
FIG. 4 is a sectional side view of part of the compensator and cable of FIG. 2.
Figure 5:
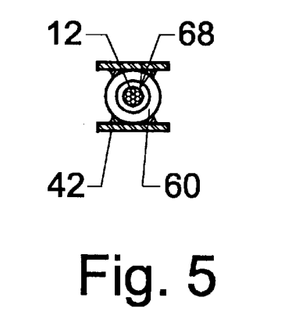
FIG. 5 is a sectional bottom view of the compensator of FIG. 2 showing the lower gripping assembly of the compensator.
Figure 6:
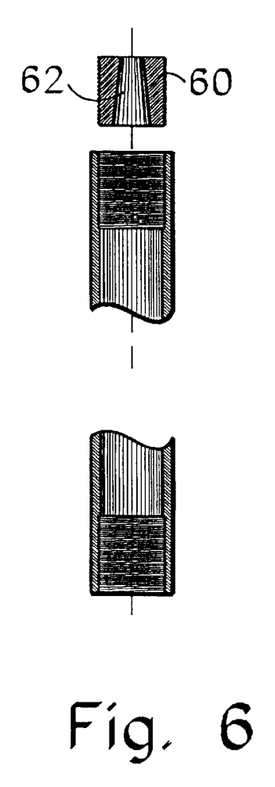
FIG. 6 is a sectional side view of the cylinder of an upper gripping assembly of the compensator of FIG. 4.
Figure 7:
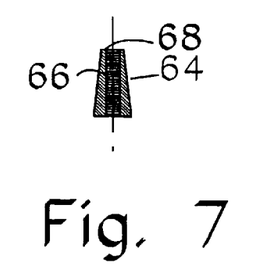
FIG. 7 is a sectional view of the wedges receivable in the cylinder of FIG. 6.
Figure 20:
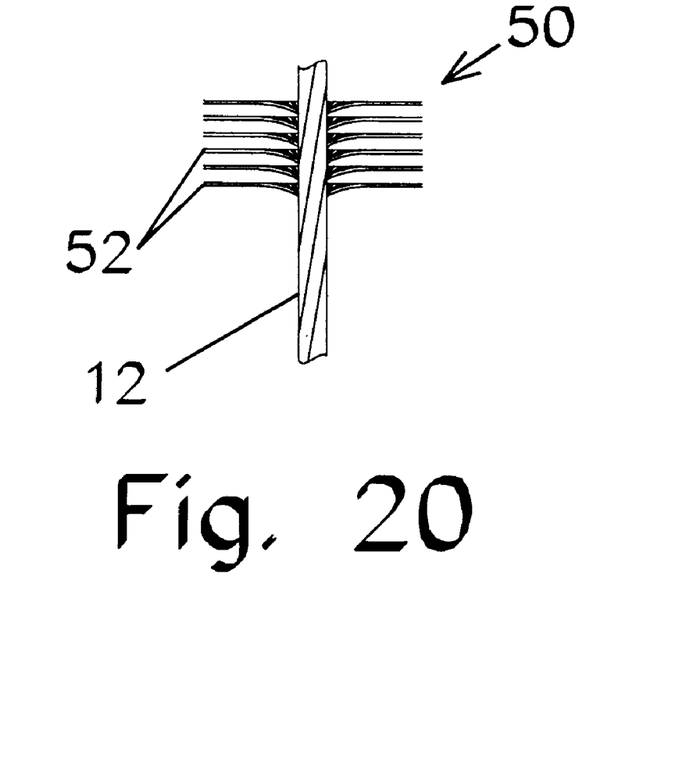
FIG. 20 shows a side view of another embodiment of a spring assembly of the invention.
Figure 21:
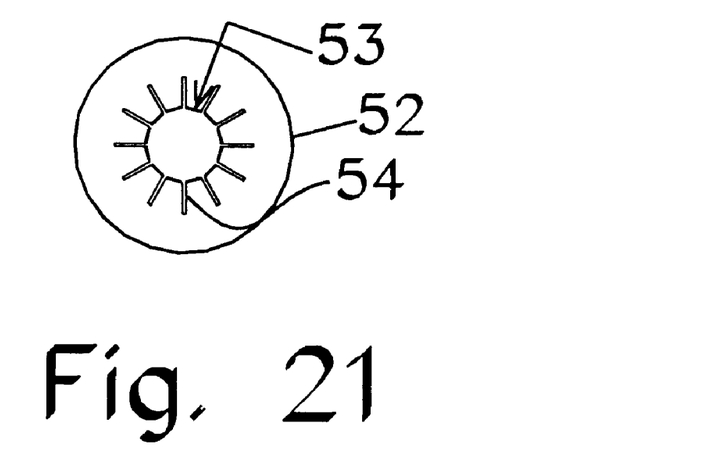
FIG. 21 shows a plan view of a resilient member used in the embodiment of FIG. 20.
Figure 22:
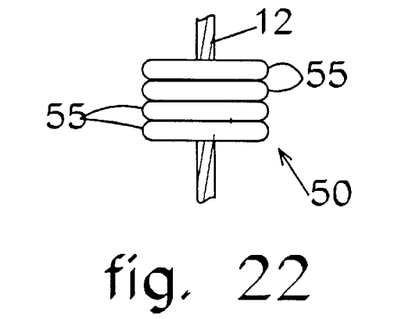
FIG. 22 shows a side view of yet another embodiment of a spring assembly of the invention.

The compensator 40 includes a housing 42, a lower connector 44, an upper cable gripping assembly 46 secured relative to the housing 42, a lower cable gripping assembly 48, slidably received in the housing 42, and a spring assembly 50 in the form of a plurality of domed washers 51 made of spring steel or other resiliently flexible material, e.g. urethane, and having a central hole for receiving the cable 12. In some applications, a single washer may suffice, the number of washers 51 depending on the force that has to be exerted on the cable 12. Another embodiment of the invention is illustrated in FIGS. 20 and 21 in which the spring assembly 50 comprises one or more spring steel washers 52, each having a central hole 53 and radial slots 54. The holes 53 are slightly smaller in diameter than the diameter of the cable 12, causing them to bow out to take on a domed configuration, as illustrated in FIG. 20. The washers 52 thus form a resilient structure similar to the washers 51 of the FIG. 1 embodiment. In yet another embodiment, the spring assembly 50 consists of a plurality of resilient buffers or bushes 55, as illustrated in FIG. 22 e.g. resiliently compressible plastic, urethane or rubber bushes. Instead of a plurality of individual bushes, a single elongate buffer or bush can be used being in the form of a thick walled tube. This is sometimes also referred to as a "marshmallow". The FIG. 1 embodiment of the compensator 40 is illustrated in greater detail in FIGS. 2 to 7. FIGS. 2 and 3 show the housing 42 in the form of a U-shaped bracket. The bracket 42 is provided with a hole 56 in the base 57 of the U, as shown in FIG. 3, for receiving the anchor bolt 26. The housing 42 is secured to the anchor bolt 26 by means of a square nut 58, thereby connecting the housing 42 to the foundation. The lower end of the cable 12 is, in turn secured to the housing 42 by means of the gripping assembly 46. The gripping assembly 46 comprises a cylinder 60 (shown separately in FIG. 6) that is welded to the housing 42 as illustrated in FIG. 5. The cylinder 60 has a frusto-conical bore 62 extending through it with the narrow end of the bore 62 facing upwardly. The bore 62 slidably receives a plurality of complementarily angled wedges 64 (two of which are illustrated separately in FIG. 7) having gripping inner faces 68 that define a multi-faceted, substantially cylindrical passageway for engaging the cable 12. As an upward force is exerted on the wedges 64, they are driven towards each other by the slanted walls of the frusto-conical bore 62. Thus, upward movement of the cable 12 simultaneously drives the wedges upwardly and inwardly due to frictional engagement of the cable 12 with the inner faces 68 of the wedges 64, thereby securely locking the cable 12 relative to the compensator 40. To increase the gripping engagement between the wedges 64 and the cable 12, the inner surfaces 68 of the wedges 64 can be provide with teeth.

In practice, when the tension in the cable 12 diminishes due to contraction of the building members to which the system is attached, it is necessary to unlock the cable 12 from the compensator 40 to permit the length of the cable 12 to be adjusted. This is achieved by driving the wedges 64 downward thereby allowing them to move apart and disengage from the cable 12. In order to effect the downward movement of the wedges 64, a downward force is exerted on the cable 12 when the tension in the cable diminishes to a predetermined magnitude. This downward force on the cable 12 is achieved by means of the spring assembly 60 which is compressed between the upper gripping assembly 46 and the lower gripping assembly 48. The lower gripping assembly 48 is substantially the same as the upper gripping assembly 46, except that it is slidably received in the housing 42 to permit axial movement of the cylinder 70 with its wedges 72 relative to the housing 42. Furthermore, the wedges 72 remain in gripping engagement with the cable 12 once the lower assembly 48 has been assembled and the spring assembly compressed. The lower cable gripping assembly 48 is thus effectively locked in position relative to the cable 12. Therefore any downward movement of the lower gripping assembly 48 pulls the cable 12 downward as well. The spring assembly 50 engages the lower surface 74 of the cylinder 60 and the upper surface 76 of the cylinder 70. Thus when the force exerted by the spring assembly 50 exceeds the force due to the tension in the cable 12, the spring assembly 50 forces the lower gripping assembly 48 downward thus exerting the necessary downward force on the cable 12 to disengage the wedges 64 of the upper gripping assembly 46 from the cable 12 and allowing the cable 12 to be moved downward through the passageway created between the inner faces 68 of the wedges 64. The downward movement of the cable 12 thus reestablishes the tension in the cable 12.

Figure 8:
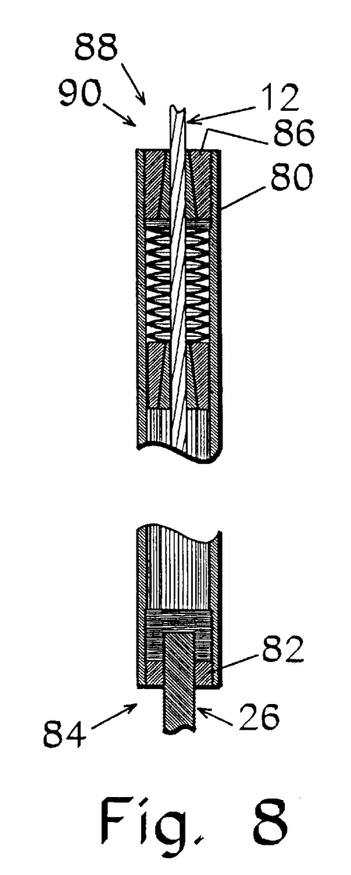
FIG. 8 is a sectional view of another embodiment of a compensator, shown attached to an anchor bolt.
Figure 9:
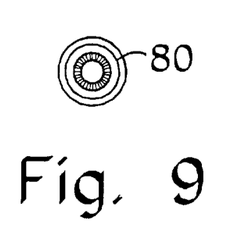
FIG. 9 is a plan view of the compensator of FIG. 8.

Another embodiment of the invention is illustrated in FIGS. 8 and 9. Instead of the housing being in the form of a U-shaped bracket, the housing 80, in this embodiment, comprises a cylindrical tube, e.g. a steel tube. The tube 80 is partially closed at its lower end by a block 82 that is secured to the lower end of the tube 80 and has a central, threaded bore extending axially through the block 82. The threaded bore of the block 82 receives the complementarily threaded anchor bolt, thereby securing the tube 80 relative to the foundation or other building element to which the anchor bolt is secured. It has been found that the block 82 can easily be secured to the tube 80 by being provided with an external thread (not shown) engageable with a complementary thread provided on the inner, surface of the tube 80 at the tube's lower end 84. Similarly the cylinder 86 of the upper gripping assembly 88 is provided with an external thread in this embodiment to engage a complementary thread provided on the inner surface of the tube 80 at the upper end 90 of the tube 80. It will be appreciated that the block 82 and cylinder 86 can, instead, be secured to the tube 80 by welding them to the tube 80.

Figure 10:
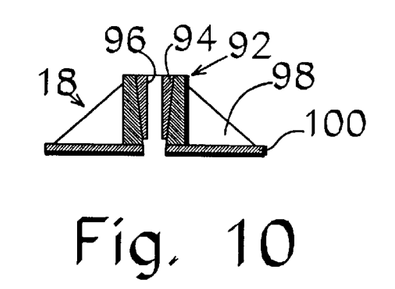
FIG. 10 is a sectional view of a cast metal gripping unit used in one embodiment of the system of the invention.

The various gripping assemblies of the compensator 40 were discussed in some detail above. The gripping unit 18, which secures the upper end of the cable 12 to the top plates 14, has a similar design. As illustrated in FIG. 10, the unit 18 comprises a cylinder 92 having a frusto-conical bore extending axially through the cylinder, the bore having its wider end facing upwardly. A plurality of wedges 94 having an outer surface that is angled in complementary fashion to the inner surface of the bore, are received in the bore. The inner surfaces of the wedges 94 define a central passageway 96 for receiving the upper end of the cable 12. A downward force on the wedges 94 caused by a downward force on the cable 12 which is transmitted to the wedges 94 by the frictional engagement of the cable 12 with the wedges 94, causes the wedges 94 to move downward and inwardly thereby firmly engaging the cable 12 and locking it into place relative to the unit 18. The inner surfaces of the wedges 94 are provided with teeth (not shown) to grip the cable 12 more securely. Ribs 94 are welded to the cylinder 92 and extend radially from it to provide support to the cylinder 92. The cylinder 92 and the ribs 98 rest on a wooden bearing plate 100 that, in turn, rests on the upper plate of the top plates 14.

Figure 11:
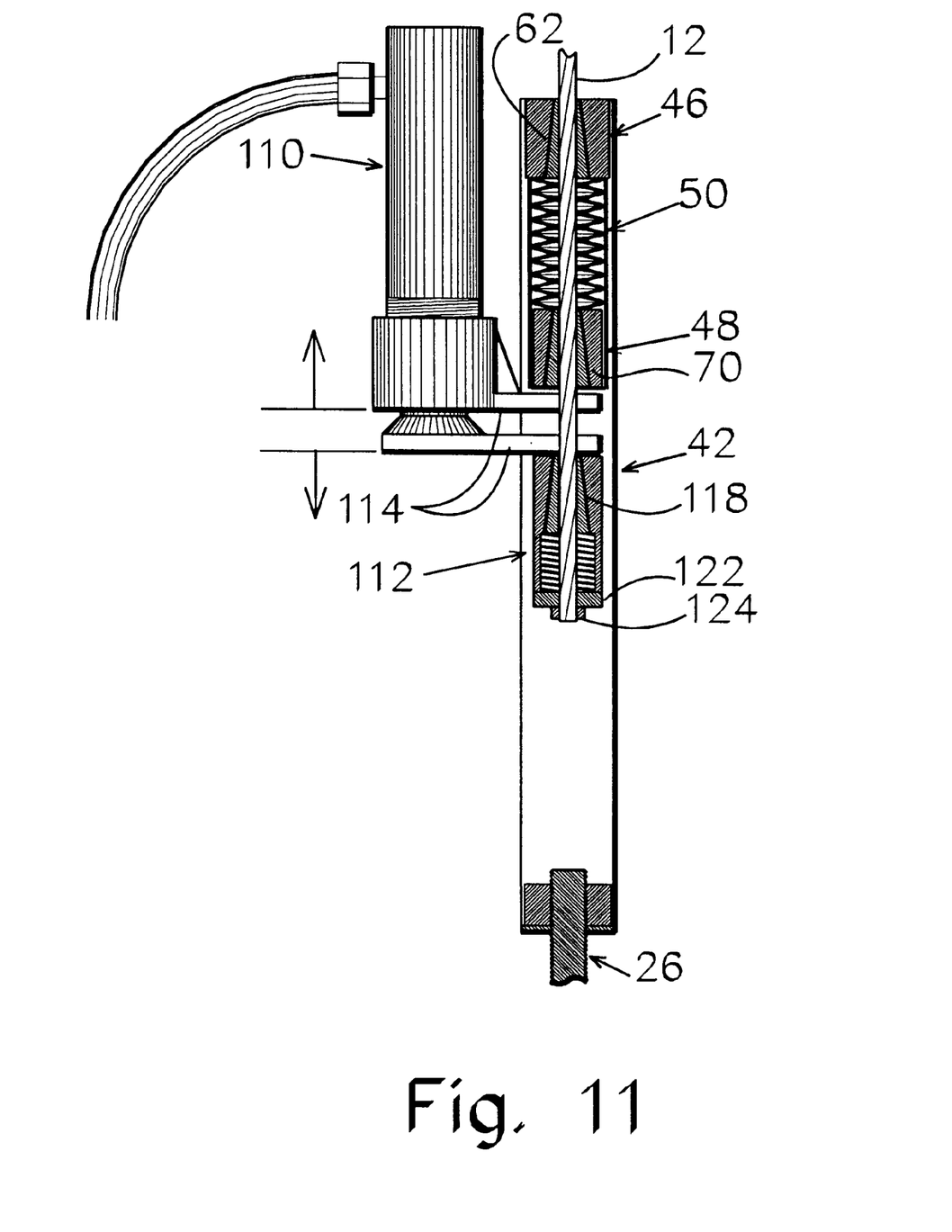
FIG. 11 is a partially sectioned schematic side view of part of the system of FIG. 1 showing the process of compressing the spring assembly of the compensator.
Figure 12:
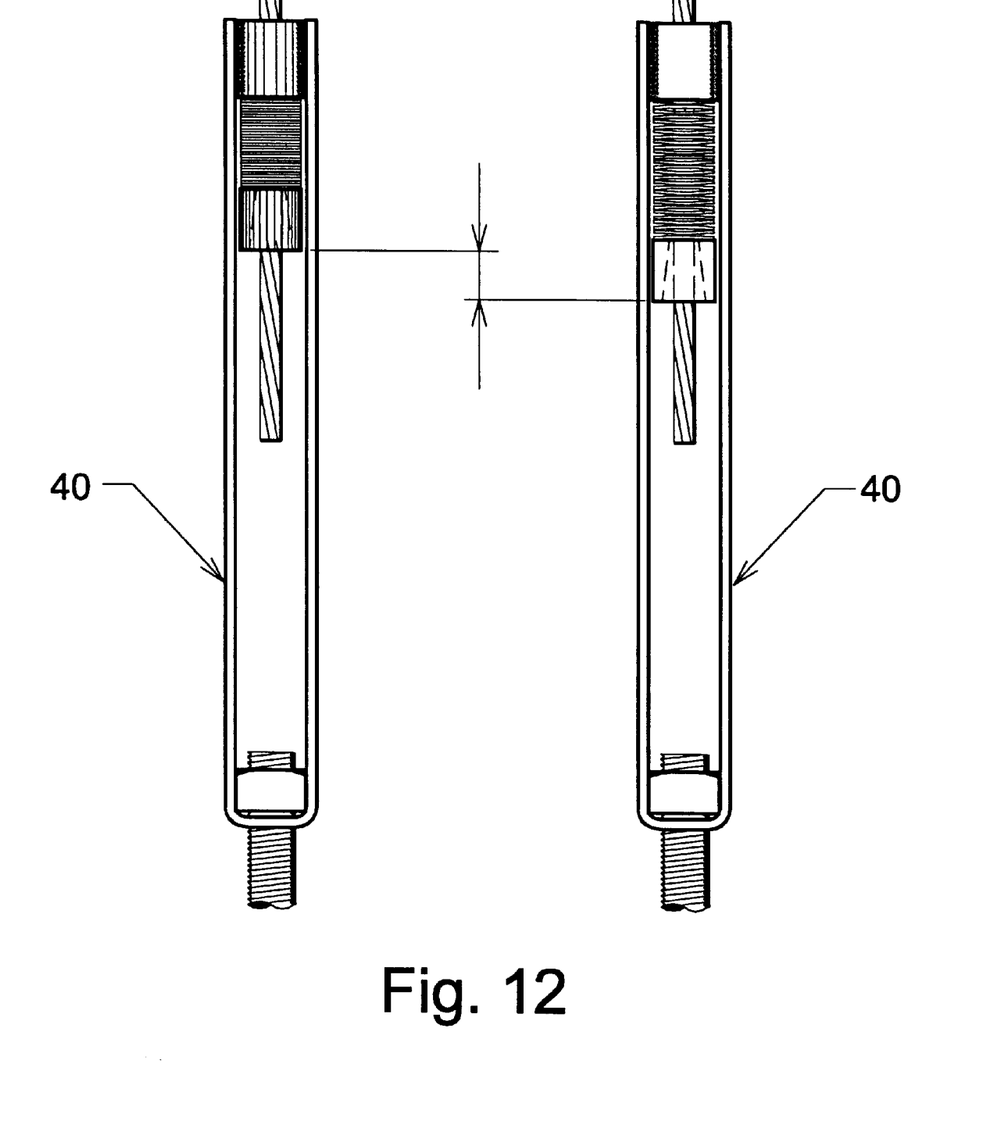
FIG. 12 is a comparative side view of two compensators showing a compensator in a compressed state next to a compensator in a relaxed state.

The installation of the embodiment illustrated in FIGS. 2 to 7 will now be described. As mentioned above, the spring assembly 50 has to be compressed in order to exert the requisite force on the cable 12. During installation the spring assembly 50 is compressed using a hydraulic ram 110 as illustrated in FIG. 11. Prior to compression, installation of the system 10 is effected by drilling a hole from the top of the building through the various top plates, sill plate, and other building elements that lie in the proposed path of the cable 12. For this purpose a drill with a sufficiently long drill bit is found to work well to ensure alignment of the holes through the various building elements. The cable 12 is then passed through the drilled holes and secured at the upper end by means of the gripping unit (FIG. 1). Thereafter the housing 42 is screwed onto the anchor bolt 26 by means of the nut 58. Prior to passing the lower end of the cable through the housing 42, the cable wedges 62 are inserted into the upper gripping assembly 46 followed by the spring assembly 50, and the lower gripping assembly 48. The cable 12 is then passed through the gripping assemblies and spring assembly 50, and through a temporary gripping assembly 112. The arms 114 of the hydraulic ram 110 are then located between the lower gripping assembly 48 and a temporary gripping assembly 112. It will be appreciated that in the embodiment of FIG. 8 a slot has to be provided in the wall of the tube 8 to accommodate the arms 114 of the hydraulic ram 110. The temporary gripping assembly 112 has a design and configuration similar to the lower gripping assembly 48. The arms 114 act on the cylinder 70 and the cylinder 116 causing the temporary gripping assembly 112 to engage and lock relative to the cable 12 while permitting the gripping assembly 48 to disengage from the cable 12 and move up on the cable 12 as the arms 114 of the hydraulic ram 110 are spread apart. This compresses the spring assembly 50 to the desired extent. When the arms 114 are again brought together, the gripping assembly 48 locks in place relative to the cable 12, thereby maintaining the compression of the spring assembly 50. The hydraulic ram 110 is then remove, as is the temporary gripping unit. In order to release the wedges 118 of the temporary gripping assembly 112 they may be forced downward physically using a suitable tool inserted into the gripping assembly 112 from above, or by pushing the cylinder 116 upwardly. Alternatively a spring 120 acting on the cylinder 116 may be included as illustrated in FIG. 11. The lower end of the spring 120 is retained by a plate 112 held in place relative to the cable by a sleeve 124 crimped to the cable 12. Once the ram 110 and temporary gripping assembly are removed the compensator 40 remains in a compressed state provided the tension on the cable 12 does not fall below the force exerted by the spring assembly 50. FIG. 12 shows a comparison of the compensator 40 in its compressed and uncompressed states.

Figure 13:
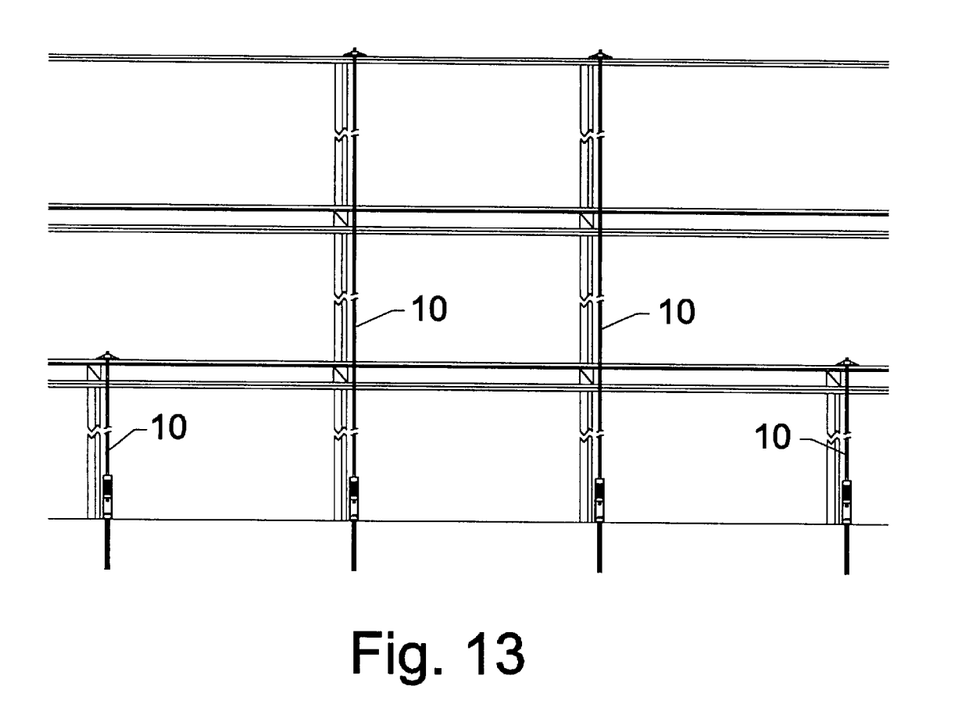
FIG. 13 shows a partially sectioned side view of various applications of the system of the invention.

For purposes of convenience, the positioning of the system 10 and the relative location of the component parts has been made by referring to the upper and lower ends as depicted in the Figs. It will, however, be appreciated that the entire system need not necessarily be installed in the orientation depicted and could equally well be installed horizontally, at and angle to span diagonally between two building elements, or upside-down, depending on what elements of a building structure are to be secured to each other. Some vertical orientated applications of the system 10 are illustrated in FIG. 13. The diameter and strength of the anchor bolts and cables, and the spring assembly height used in each case depends on the uplift forces that the system is to withstand. For purposes of safety a safety factor of 2 is used in choosing the capacities of the anchor bolts and cables. Depending on the number of floors of the building structure and the resultant number of horizontal building members, the amount of wood shrinkage varies. It has been found that most wood shrinkage occurs in a direction perpendicular to the wood grain. Therefore, as an approximation, the dimensional change of a building with time can be approximated by multiplying the number of horizontal members having a 2 inch by 10 inch cross section, by a shrinkage factor per horizontal member to arrive at the total approximate shrinkage. Some spring assembly heights for use in vertical hold-down units have been calculated and are shown in the Table below for various numbers of building floors.

| JOIST FLOORS | TOTAL TRAVEL AVAILABLE |
| --- | --- |
| 1 | 0.74 inch |
| 2 | 1.15 inch |
| 3 | 1.5 inch |
| 4 | 1.85 inch |

Figure 14:
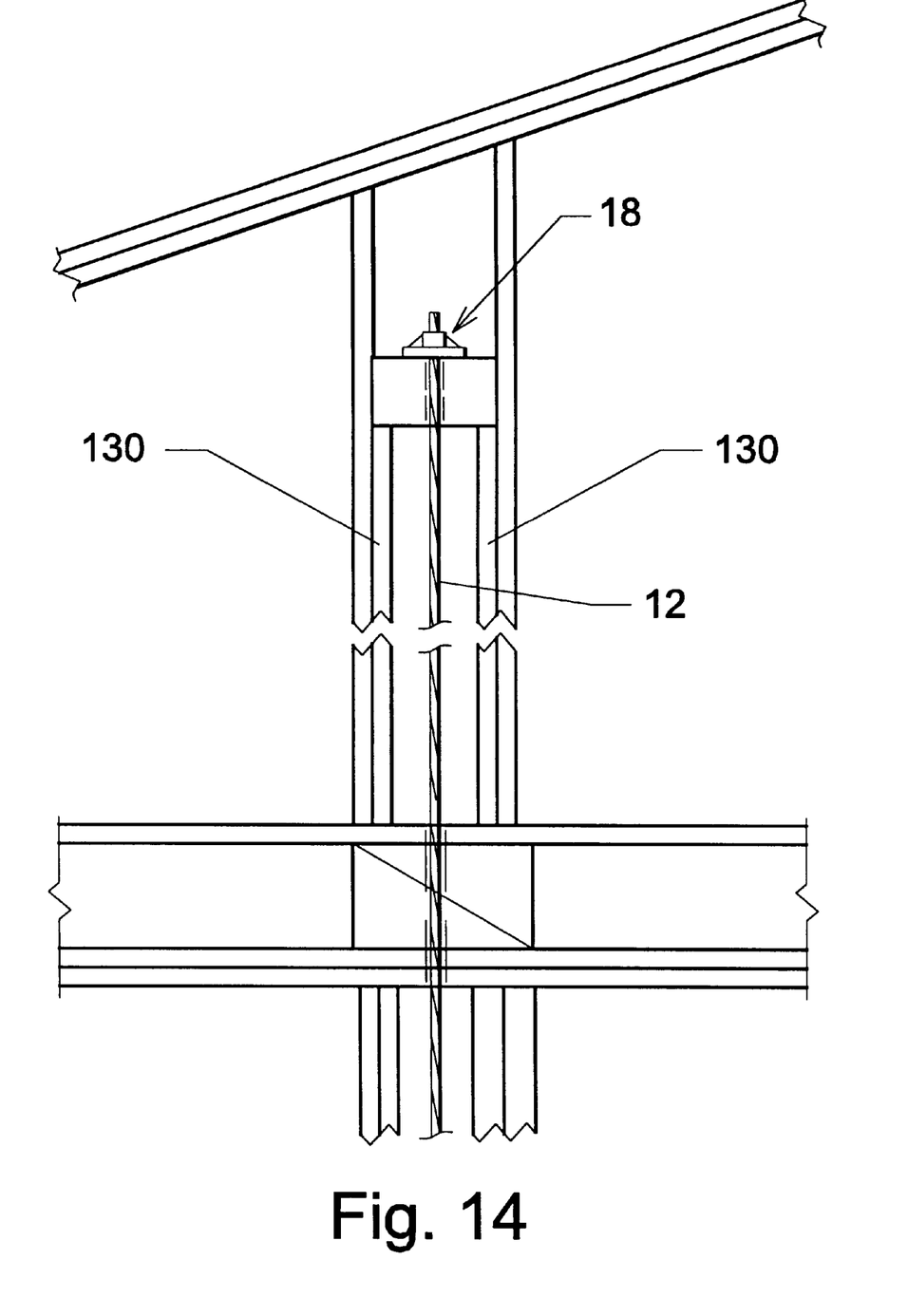
FIG. 14 is a sectional side view of a building showing an upper connection of a system of the invention in a particular application.
Figure 15:
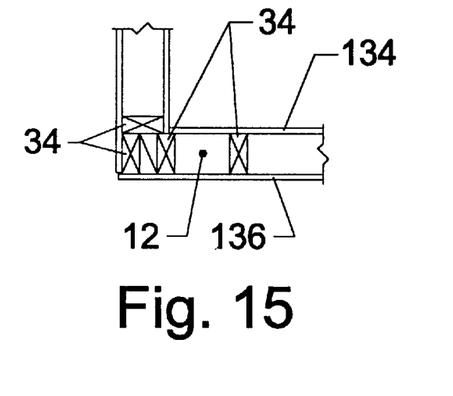
FIGS. 15 to 18 show sectional plan views of various building sections illustrating the location of the system of the invention in each case.

In vertical applications where no horizontal upper plate is available to support the upper gripping unit 18, cripple studs 130 may have to be installed to support a header 132 (PLEASE CONFIRM) as illustrated in FIG. 14.

Figure 16:
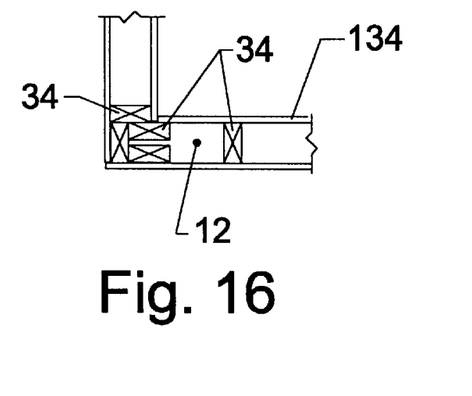
Figure 17:
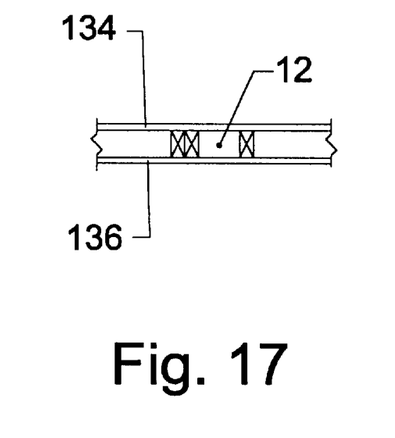
Figure 18:
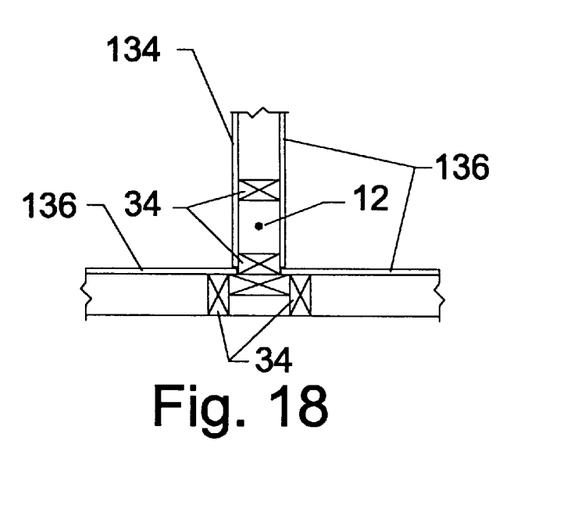
Figure 19:
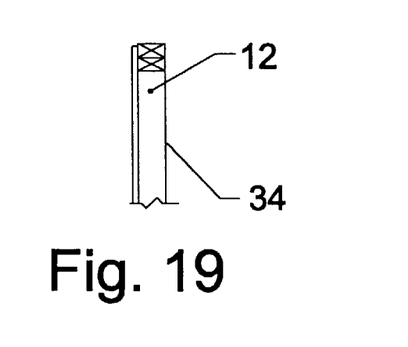
FIG. 19 shows a sectional end view through building section, illustrating the location of the system of the invention in a horizontal application.

Cross sectional plan views through various portions of a building are shown in FIGS. 15 to 18 to illustrate examples of the positioning of the system of the invention as depicted by the cable 12 in each case. As is illustrated, the cable 12 may be positioned between vertical building elements or studs 34 as shown in FIG. 16 or adjacent the studs 34, between the dry wall 134 and the plywood sheet 136, as illustrated in FIGS. 16 to 18. FIG. 19 shows an application of the system in a horizontal configuration. The cable 12 extends through studs 34 (only one shown) to connect selected vertical elements to each other.

Figure 23:
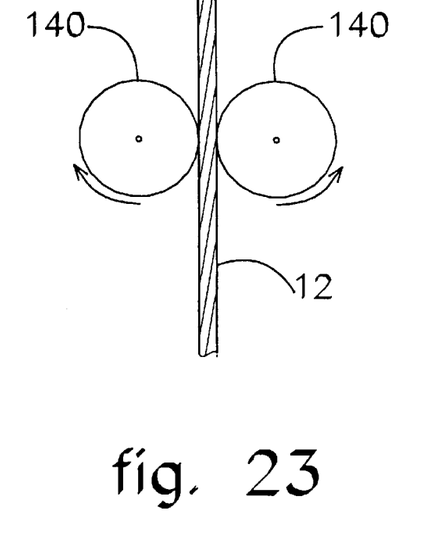
FIG. 23 shows a side view of another embodiment of a gripping assembly.
Figure 24:
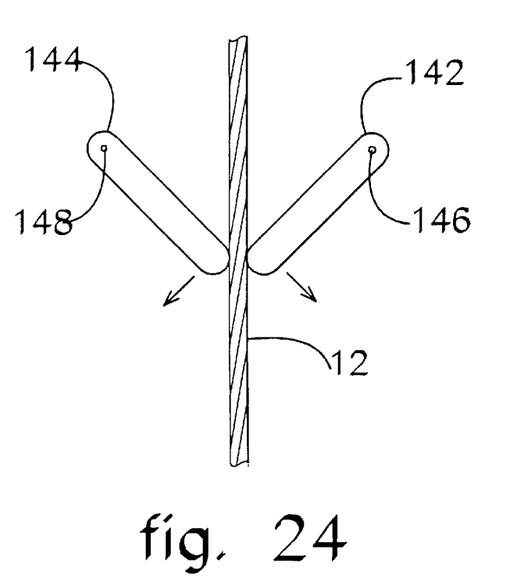
FIG. 24 shows a side view of yet another embodiment of a gripping assembly of the invention.

The embodiments and applications described above are by way of illustration only and are not to be seen as the only configurations or applications. Other materials can be used for the various elements of the system 10 and other configurations are possible without departing from the scope of this invention. For example, the first cable gripping assembly can take the form of a pair of gripping wheels 140 engaging the cable 12 and rotatable in only one direction, the respective directions of rotation being in opposite direction to each other as shown by the arrows in FIG. 23, the wheels opposing each other to engage opposite side of the cable. In yet another embodiment, illustrated in FIG. 24, the first cable gripping assembly takes the form of a pair of pivotable arms 142, 144 pivotable about pins 146, 148. The arms engage opposite sides of the cable 12. Clearly only one pivotable arm opposing a stop surface could be used to grip the cable between the arm and the stop surface. The second cable gripping assembly can have a similar configuration of the embodiments illustrated in either FIG. 23 or FIG. 24.

Figure 25:
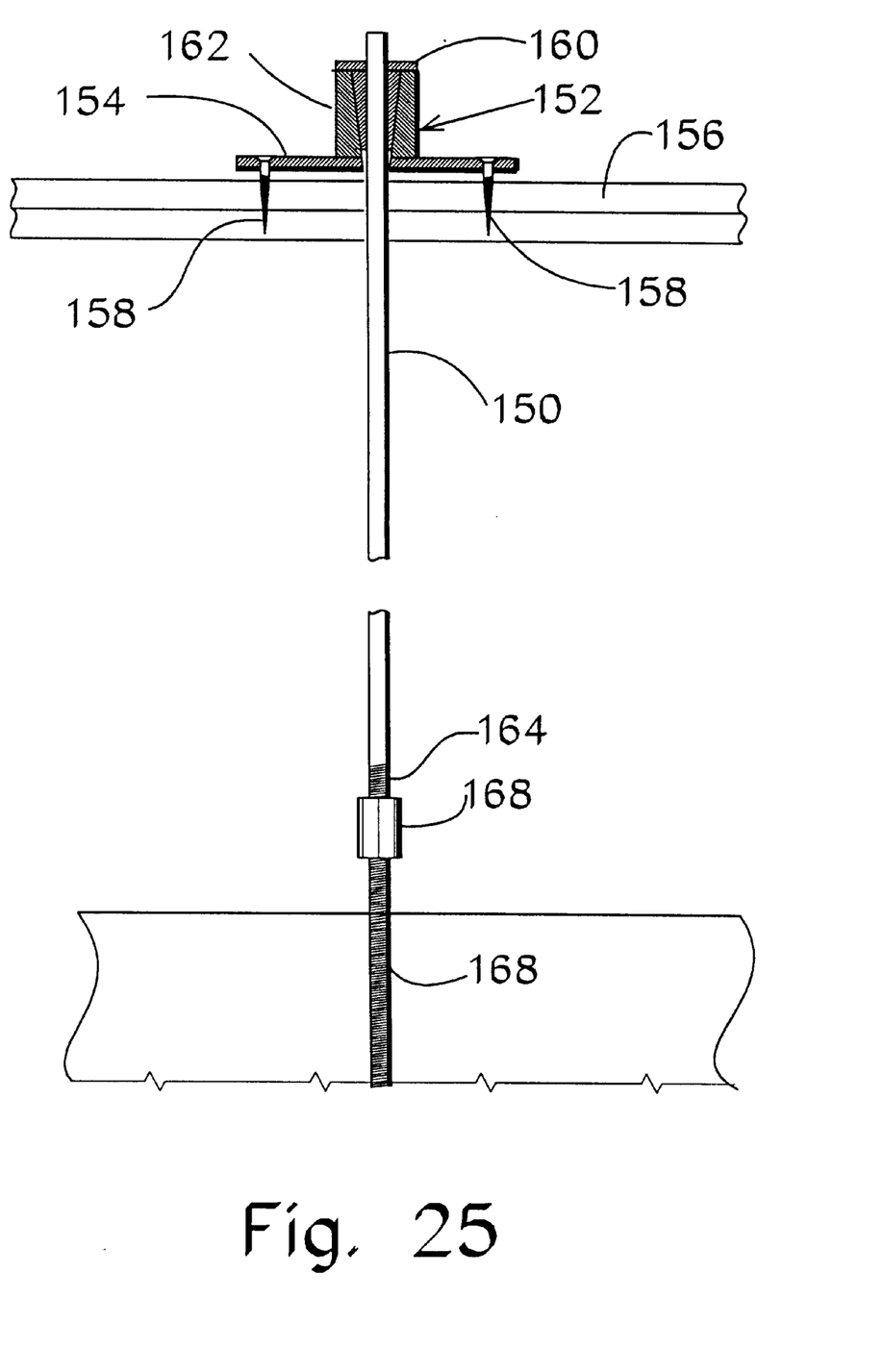
FIG. 25 is a side view of yet another embodiment of the system of the invention.

Another embodiment of the invention is illustrated in FIG. 25. Instead of a compensator to adjust the length of the cable as shrinkage takes place, the necessary force is achieved by providing an elongate member in the form of a rod 150 having sufficient compressive strength and rigidity to allow the rod 150 to be pushed through an upper gripping unit 152 as the structural members of the building structure shrink. The gripping unit 152 takes a form similar to the unit 18 described above. The wedges (not shown in FIG. 25) of the unit 152 permit the rod 150 to move through the unit 152 in an upward direction but grip the rod 150 when a downward force is exerted on the rod 150. The unit 152 is supported on a lad bearing plate 154 and is secured to the upper top plate 156 by means of lag screws 158. A top plate 160 retains the wedges of the unit 152 within the housing 162 of the unit 152. The lower end 164 of the rod 150 is threaded and secured to the anchor bolt 166 by means of a threaded coupler 168.

Figure 26:
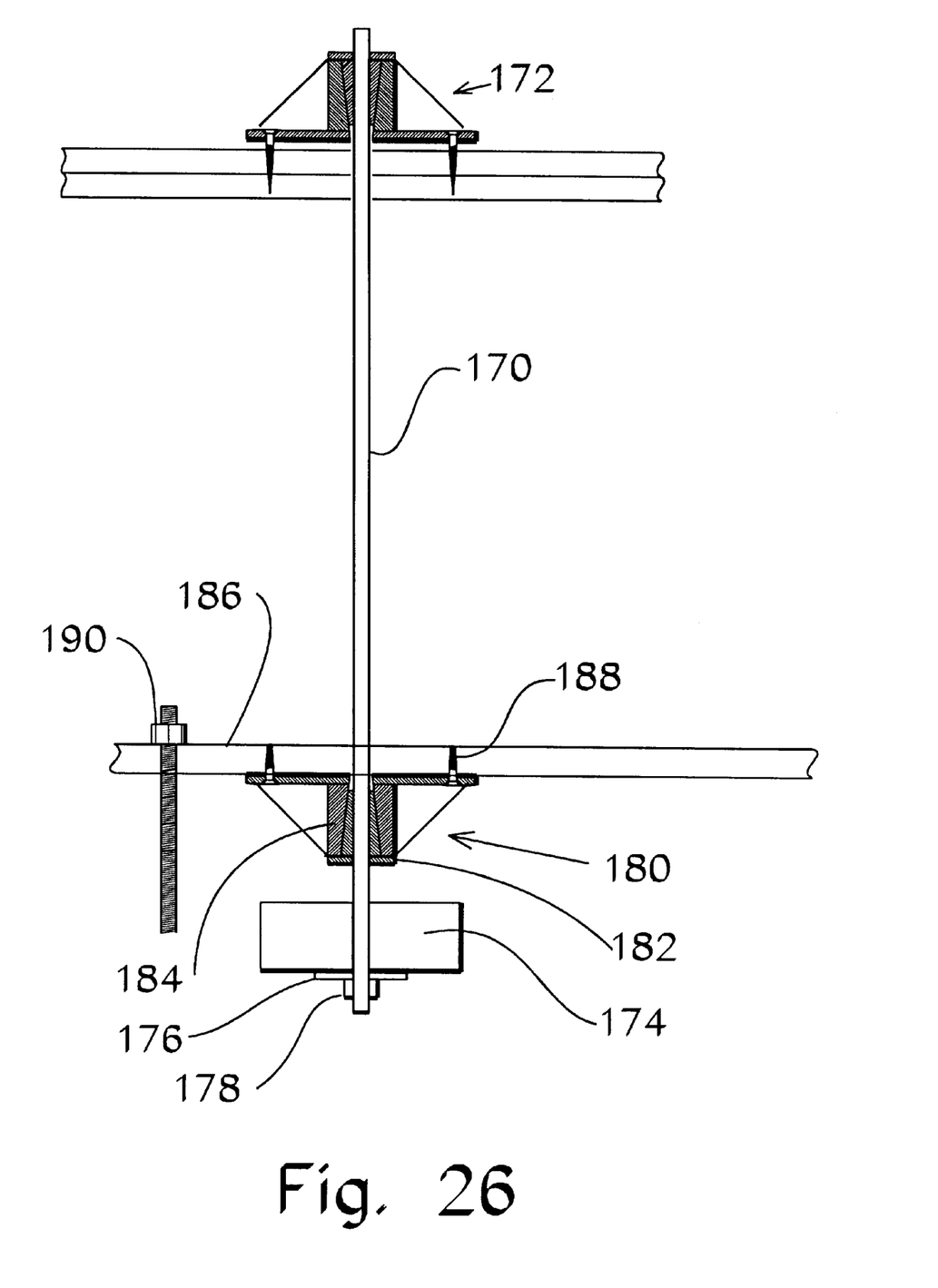
FIG. 26 is a side view of yet another embodiment of the system of the invention.

Yet another embodiment of the invention is illustrated in FIG. 26. A wire rope, referred to hereafter as a cable 170, is secured at it one end to a gripping unit 172, which has a similar configuration to the unit 18 in the embodiment of FIG. 1. Wedges (not shown) in the unit 172 prevent the cable from moving downward. The other end of the cable 170 is connected to a weight 174, which is held in place relative to the cable 170 by means of a plate 176. The plate 176 is, in turn, secured relative to the cable 170 by a sleeve 178 crimped to the cable 170. The weight 174 exerts a downward force on the cable 170 due to gravity and thereby maintains the cable under tension. The cable 170 passes through a gripping assembly 180 having a configuration similar to the first gripping assembly 46 of the FIG. 1 embodiment but which further includes a plate 182 for retaining the wedges (not shown) inside the cylinder 184 of the assembly 180. Instead of a plate 182, the wedges can be retained by a snap ring engageable in a groove (not shown) formed on the inner wall of the frusto-conical bore (not shown) of the cylinder 184. (It will be appreciated that the wedges of the unit 152 can equally well be retained by means of a snap ring instead of the plate 160.) The assembly 180 is secured to the building member 186 by means of lag screws 188, and prevents the cable 170 from moving upwardly when up lift forces are exerted on the building structure. On the other hand, when the wood of the building structure shrinks, the cable 170 moves downward through the assembly 180 under the pulling force exerted by the weight 174. Anchor bolts 190, which are embedded in the foundation (not shown), connect the member 188 to the foundation. It will be appreciated that the embodiment of FIG. 26 could dispense with the weight 174 by making use of a rod instead of a cable, thereby providing a configuration similar to that described with respect to FIG. 25.

Clearly, therefore, many different embodiments of the invention are possible without departing from the scope of the invention, each making use of a simplified urging mechanism for compensating for shrinkage of the building elements. Accordingly, the scope of this mechanism is to be limited only by the appended claims.

What I claim as my invention is:

1. A hold down device for connecting a first building element of a building structure to a second building element of the building structure, comprising a rod having a first end and a second end, and a gripping means for movably connecting the first end of the rod to the first building element, wherein the second end of the rod is connected to the second building element and the gripping means permits axial movement of the rod in only one direction to permit decreases in distance between the first and the second building elements, but resist separation of the first and second building elements.

2. A hold down device of claim 1 wherein the gripping means comprises a cylinder having a central frusto-conical bore that slidably receives a plurality of wedges having outer surfaces complementarily engaging walls that define the bore, and having inwardly facing gripping surfaces, in practice, engaging the rod.

* * * * *